US009186822B2

(12) United States Patent
Sato et al.

(10) Patent No.: US 9,186,822 B2
(45) Date of Patent: Nov. 17, 2015

(54) MOLD FOR FOAM MOLDING AND FOAM MOLDING METHOD

(75) Inventors: Masatoshi Sato, Yokohama (JP);
Toshiyuki Horimatsu, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1199 days.

(21) Appl. No.: 11/713,666

(22) Filed: Mar. 5, 2007

(65) Prior Publication Data

US 2007/0222098 A1 Sep. 27, 2007

Related U.S. Application Data

(63) Continuation of application No. PCT/JP2005/015877, filed on Aug. 31, 2005.

(30) Foreign Application Priority Data

Sep. 6, 2004 (JP) .................................. 2004-258571

(51) Int. Cl.
*B28B 7/12* (2006.01)
*B29C 33/46* (2006.01)
(Continued)

(52) U.S. Cl.
CPC ................. *B29C 33/46* (2013.01); *B29C 33/44* (2013.01); *B29C 44/58* (2013.01)

(58) Field of Classification Search
USPC ........... 264/335, 413–422, 50, 41, 45.1–45.6, 264/46.4–46.9, 51–55, 46.1, 46.2; 425/4 R, 425/233, 236, 408, 412, 414, 415, 416, 425/419–423, 556, 562, 564–566, 436–437, 425/441–444, 450.1, 451.9
See application file for complete search history.

(56) References Cited

U.S. PATENT DOCUMENTS 2,767,436 A * 10/1956 Noland et al. ................. 264/321
RE28,364 E * 3/1975 Corazza .......................... 264/51
(Continued)

FOREIGN PATENT DOCUMENTS

JP 58-153018 U 10/1983
JP 63-6813 U 1/1988
(Continued)

OTHER PUBLICATIONS

Japanese Office Action dated Nov. 27, 2009 (2 pages).

*Primary Examiner* — Stella Yi
(74) *Attorney, Agent, or Firm* — Sughrue Mion, PLLC

(57) ABSTRACT

A mold 20B for foam molding which allows efficient production of the foam molded product with accurately finished outer surface, and easy release of the molded product from the mold in the foam molding method is formed of an upper mold portion 21B and a lower mold portion 22B. The gas feed means 23 formed of the valve box 25, the valve element 26 and the like is attached to an opening formed in the bottom surface of the lower mold portion 22B. The recess portions 51 are formed in each part of the opposite side surfaces 50a and 50c of the cavity 50. The protruding portions 52 are formed on the lower surface of the upper mold portion 21B so as to be fit to the corresponding recess portion 51. Upon completion of curing, the upper mold portion is separated to open the mold, air is supplied into the valve box 25 such that air is fed to a space between the molded product 31B and the bottom surface of the lower mold portion 22B to push up the molded product 31B so as to be released from the mold. The empty spaces formed by extraction of the protruding portions 52, 52 allow insertion of the tool and finger thereinto to take the molded product 31B from the mold.

4 Claims, 8 Drawing Sheets

(51) Int. Cl.
*B29C 33/44* (2006.01)
*B29C 44/58* (2006.01)

(56) References Cited

U.S. PATENT DOCUMENTS

| | | | | |
|---|---|---|---|---|
| 5,622,402 | A * | 4/1997 | Pritchard et al. | 296/191 |
| 5,728,333 | A * | 3/1998 | Tabata et al. | 264/46.4 |
| 2004/0080080 | A1* | 4/2004 | Dalton et al. | 264/278 |
| 2005/0201418 | A1* | 9/2005 | Aoyama et al. | 370/480 |

FOREIGN PATENT DOCUMENTS

| | | | |
|---|---|---|---|
| JP | 5-8235 | A | 1/1993 |
| JP | 7-195433 | A | 8/1995 |
| JP | 08150627 | * | 6/1996 |
| JP | 9-234748 | A | 9/1997 |
| JP | 2003-62842 | A | 3/2003 |
| JP | 2004-114646 | * | 4/2004 |
| JP | 2004-114646 | A | 4/2004 |
| JP | 2004-209851 | A | 7/2004 |

* cited by examiner

Fig.1
Fig. 1a
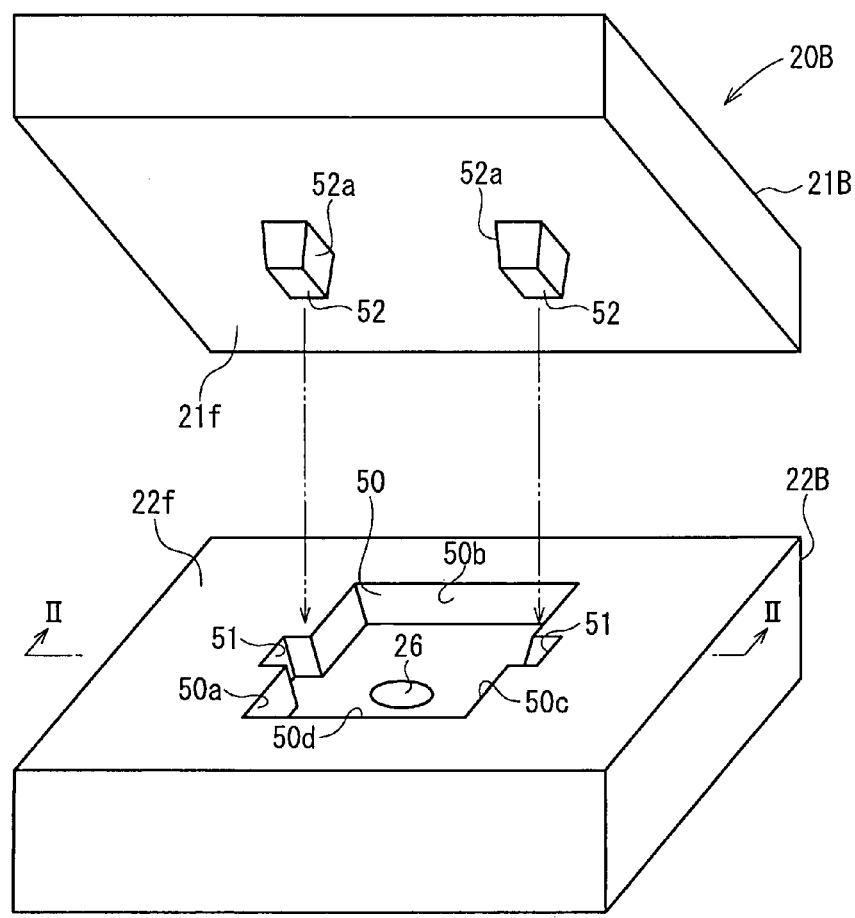
Fig. 1b
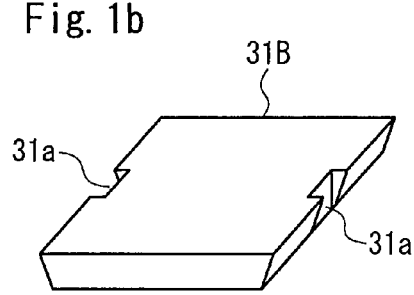

Fig.3
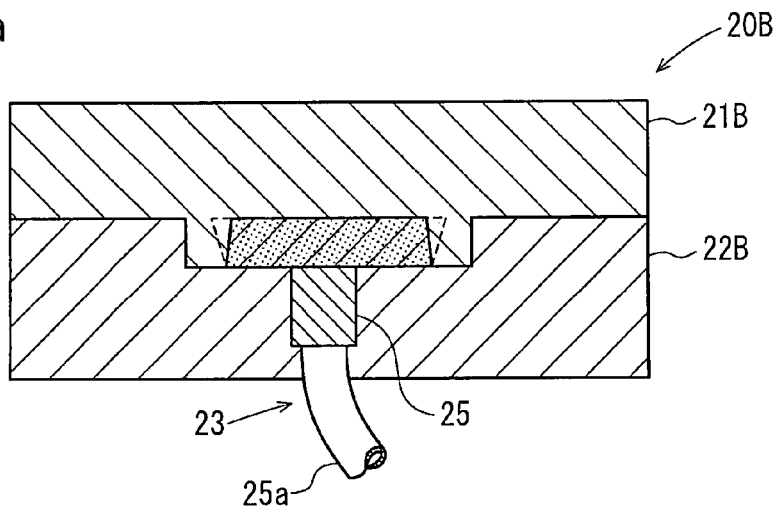
Fig. 3a
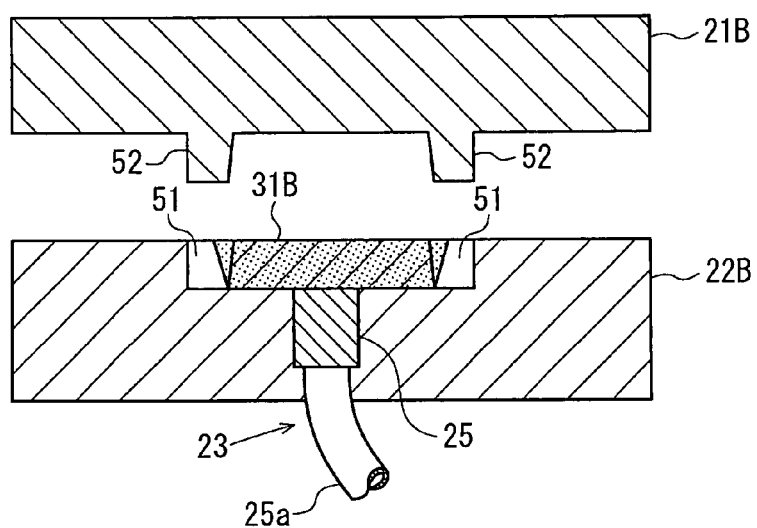
Fig. 3b
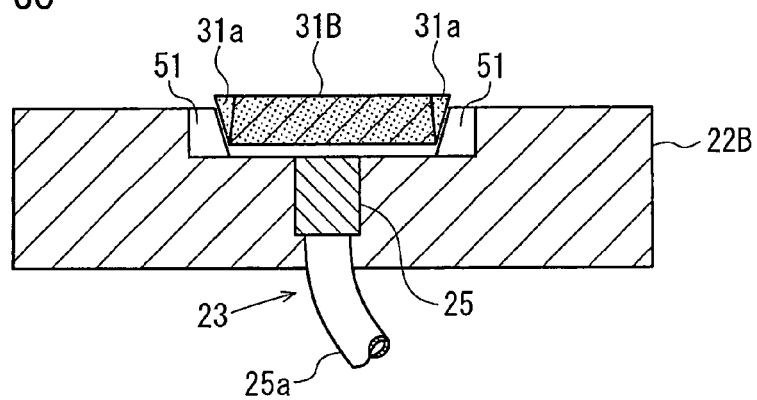
Fig. 3c

Fig.4
Fig. 4a
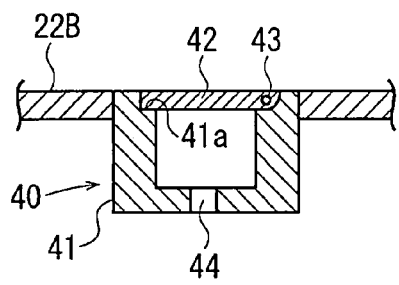
Fig. 4b
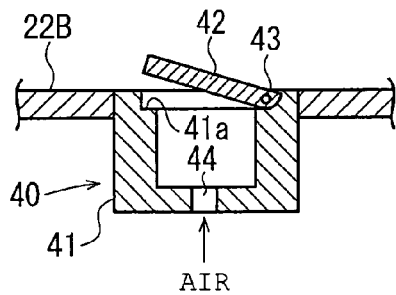
Fig.5
Fig. 5
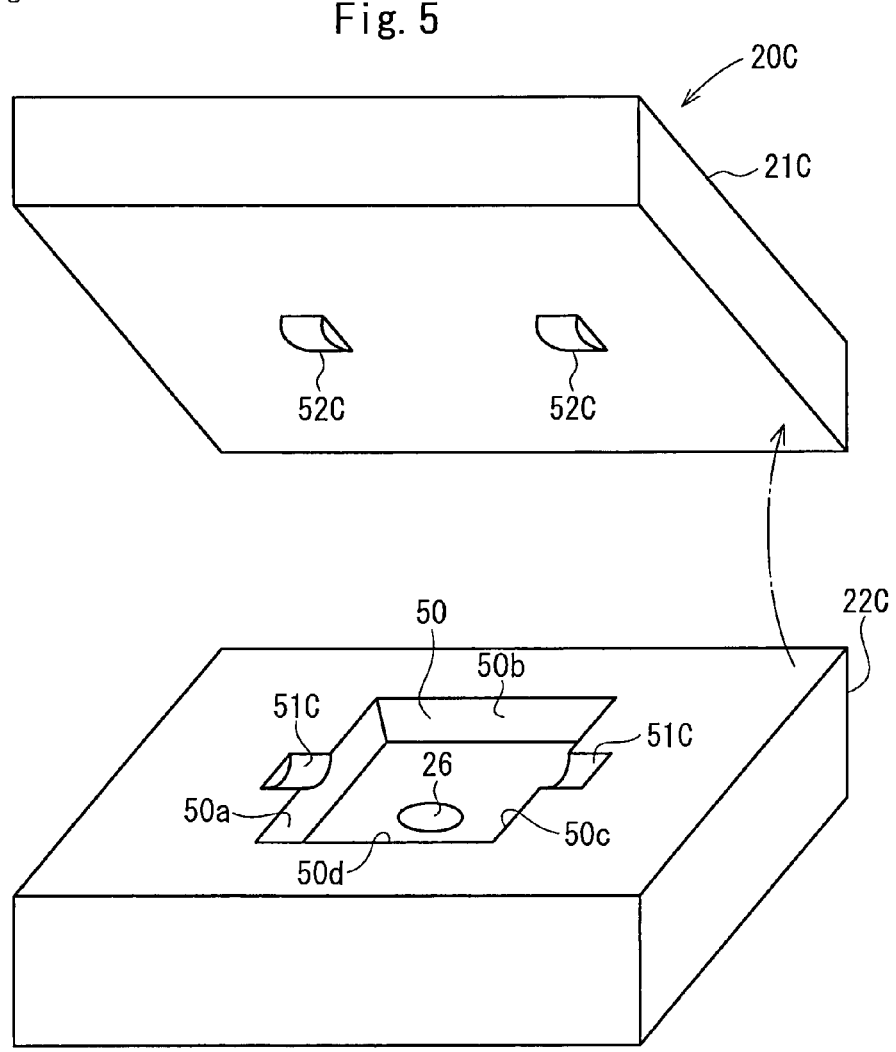

Fig.6
Fig. 6a (RELATED ART)
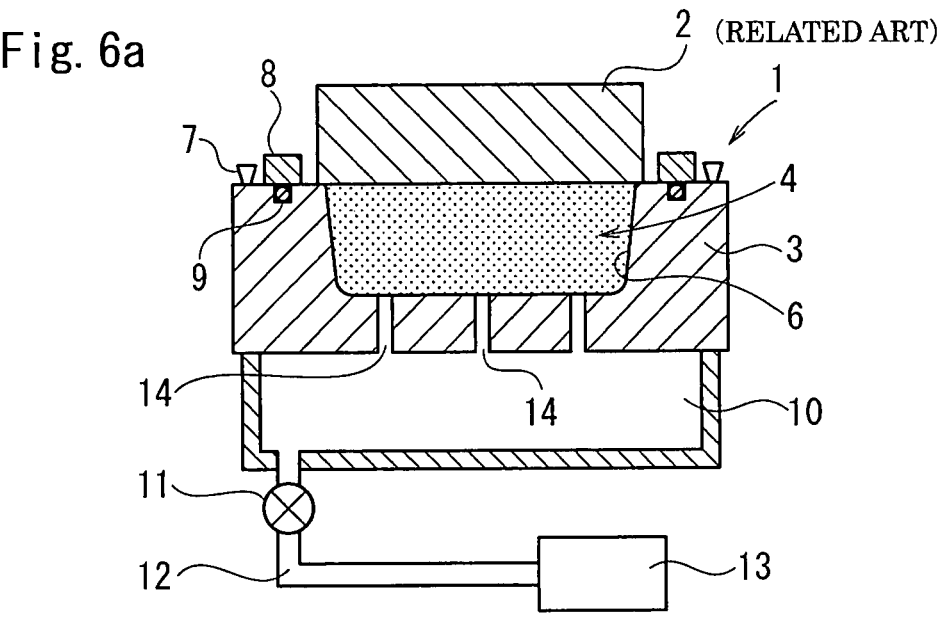
Fig. 6b (RELATED ART)
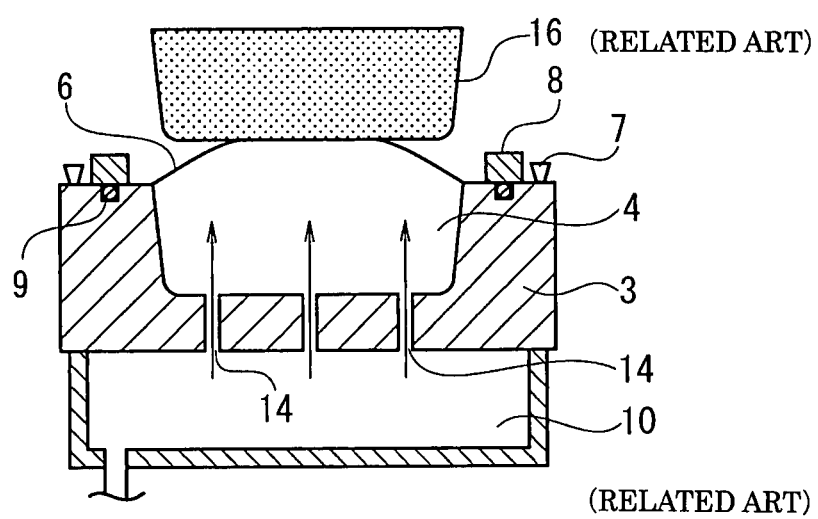
Fig. 6c (RELATED ART)
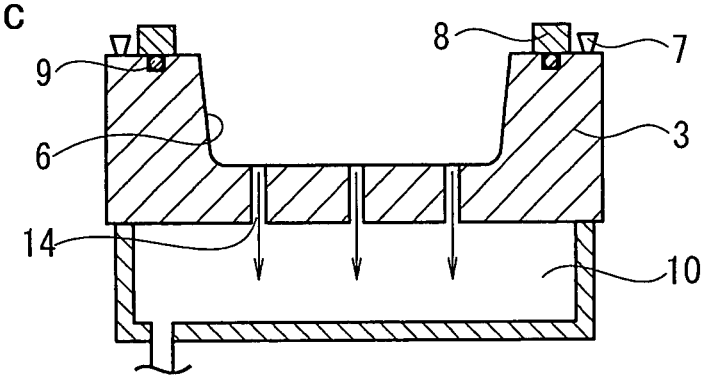

Fig.7
Fig. 7a
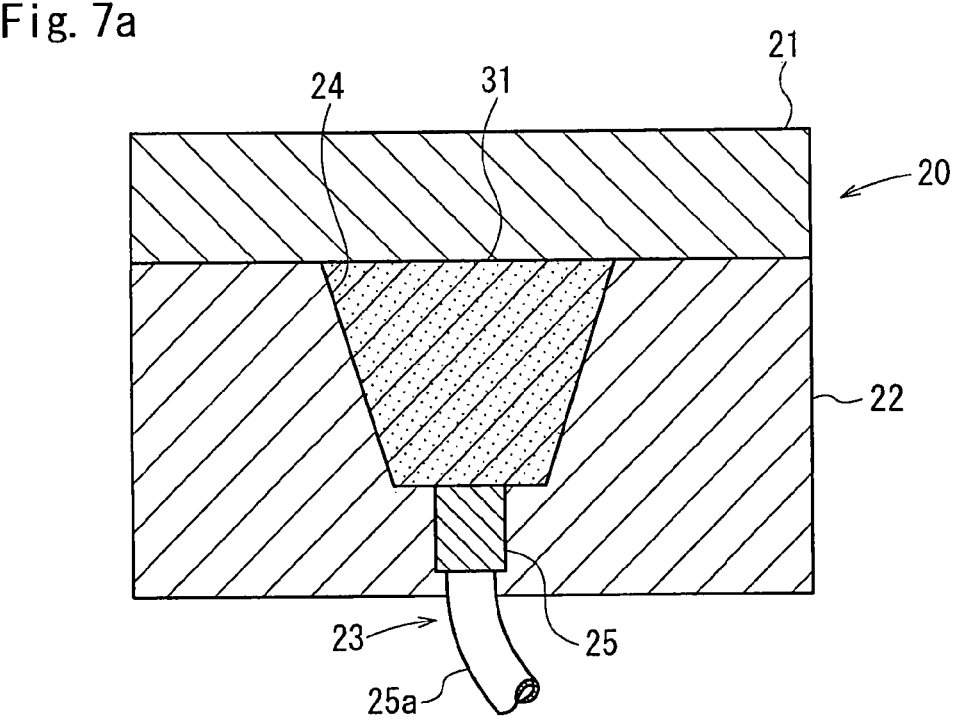
Fig. 7b
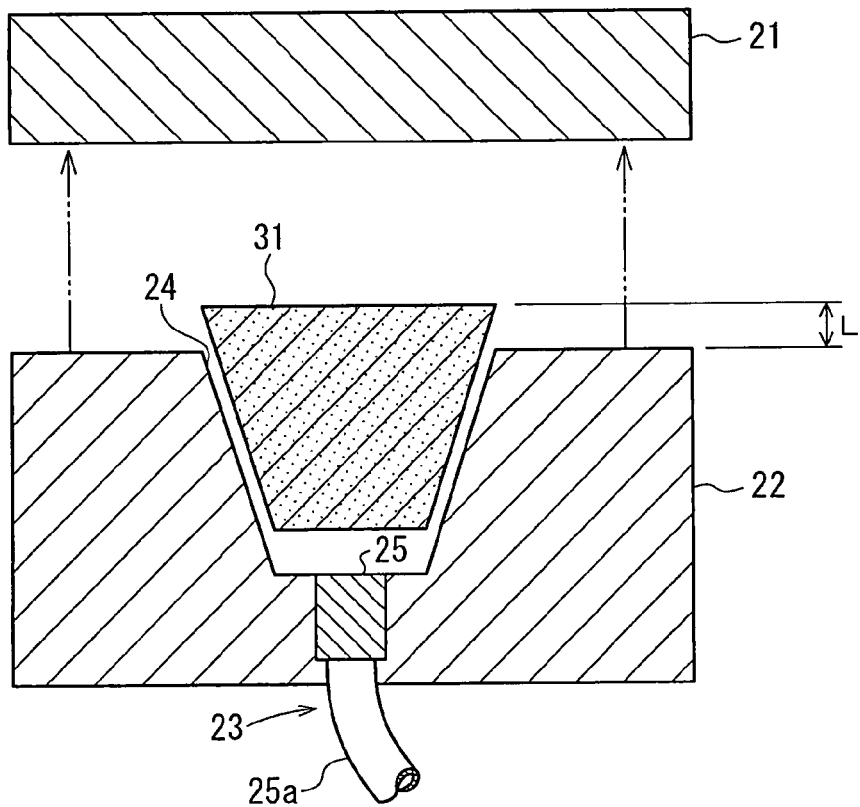

Fig.8
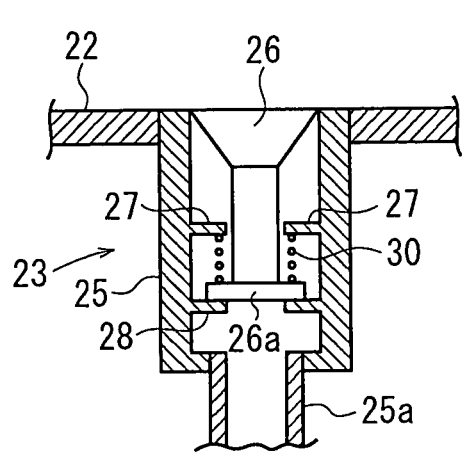
Fig. 8a
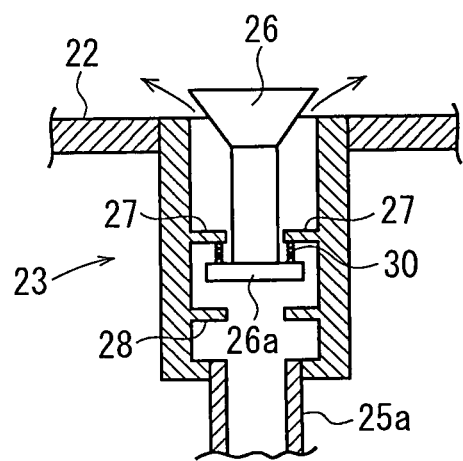
Fig. 8b

Fig.9
Fig. 9a
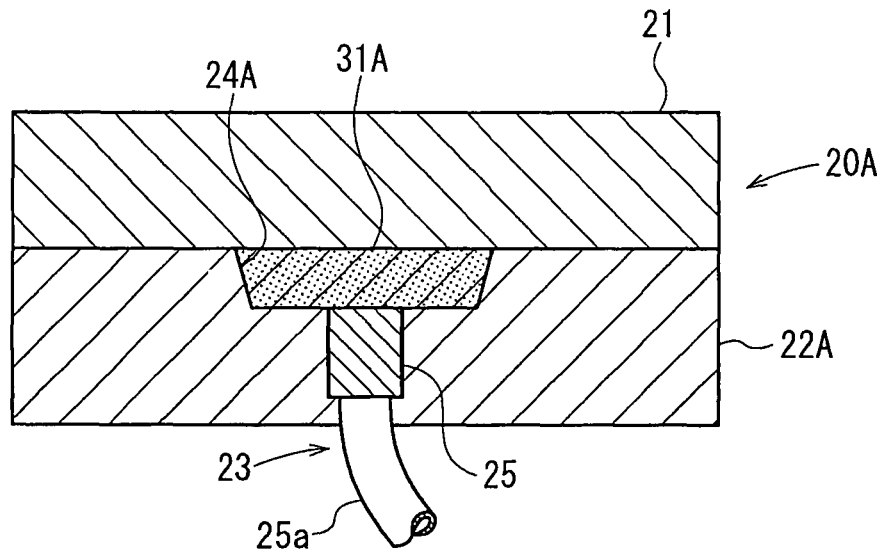
Fig. 9b
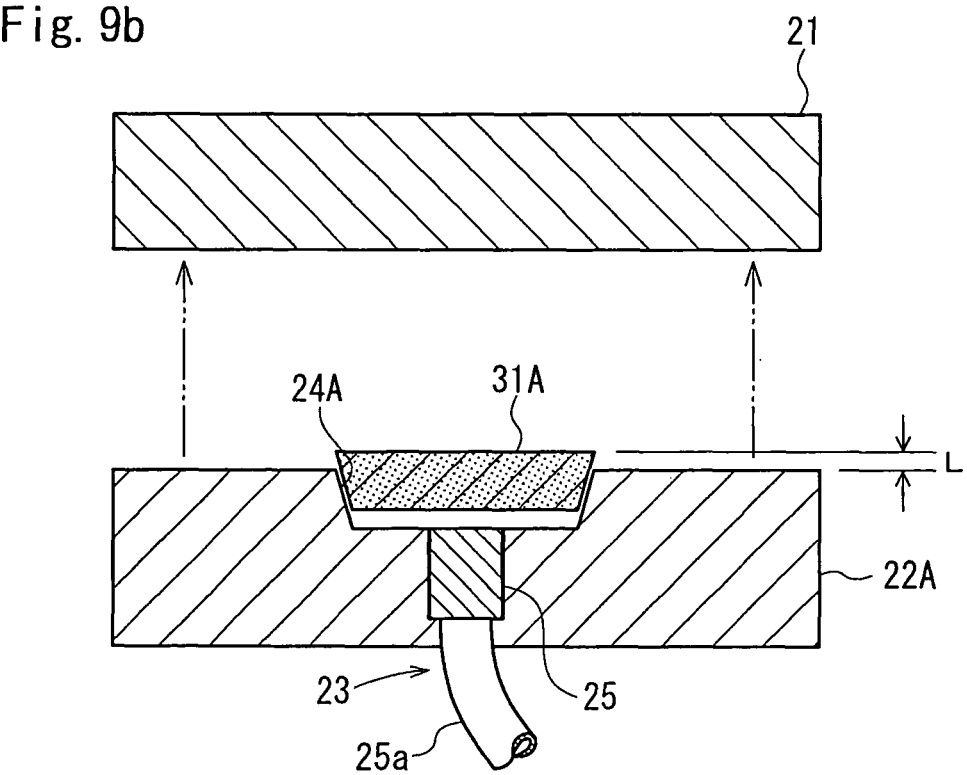

MOLD FOR FOAM MOLDING AND FOAM MOLDING METHOD

CROSS REFERENCE TO RELATED APPLICATION

This is a continuation application of PCT/JP2005/015877 filed on Aug. 31, 2005.

TECHNICAL FIELD

The present invention relates to a mold for producing a foam molded product, for example, urethane foam, and more particularly, to a mold which allows efficient release of the molded products. The present invention relates to a foam molding method using the mold.

BACKGROUND ART

For the purpose of molding the rigid polyurethane foam, the urethane raw liquid is supplied to a lower mold portion of a mold including upper and lower mold portions so as to produce the foam by clamping the mold. The mold is then opened to release the molded product after curing.

Generally, the mold for foam molding structured to push up the molded product with an ejector pin provided in the lower mold portion for the mold release has been well known. However, the mark resulting from pushing of the ejector pin is likely to be left on the molded product.

Japanese Unexamined Patent Application Publication No. 9-234748 discloses the efficient mold release method without using the aforementioned ejector pin. Specifically, in the disclosed foam molding method, the film is applied along the cavity surface of the lower mold portion, air is fed between the film and the cavity surface to release the film from the cavity surface upon the mold release after the mold opening, and the molded product is extruded outside the lower mold portion by the film.

FIGS. 6a, 6b and 6c are sectional views each showing the generally employed method and the mold used therein as disclosed in the aforementioned publication. The mold is formed of an upper mold portion 2 and a lower mold portion 3 which may be joined and separated. A cavity 4 is formed in the lower mold portion 3.

A polypropylene film 6 which is preliminarily formed to be either similar or identical to the cavity 4 through vacuum forming process is applied to the lower mold portion 3. The film 6 is held on the upper end surface of the lower mold portion 3 with fixation pins 7 and interposed between packings 9 for film air seal disposed on the upper end surface of the lower mold portion 3 and film holders 8 so as to be strongly fixed onto the lower mold portion 3.

A box-like air chamber 10 is formed below the bottom of the lower mold portion 3, to which one end of an air pipe 12 provided with a pressure regulating valve 11 is connected. The other end of the air pipe 12 is connected to an air introduction/suction unit 13, for example, a vacuum pump. The air chamber 10 is communicated with the cavity 4 of the lower mold portion via a plurality of air communication holes (air holes) 14.

In the case where the rigid polyurethane foam molded product is produced using the mold 1, a predetermined amount of the raw material of the rigid polyurethane foam is introduced to the vacuum molded polypropylene film 6 within the cavity 4, and the mold is clamped by joining the upper mold portion 2 with the lower mold portion 3. After the foaming and expansion as shown in FIG. 6a, the upper mold portion 2 is separated to open the mold, and the air introduction/suction unit 13 is activated as shown in FIG. 6b to feed air to a gap 15 between the film 6 and the cavity 4 via the air pipe 12, the air chamber 10 and the air communication holes 14 to push up a molded product 16 together with the film 6. The molded product 16, thus, may be taken out.

Thereafter, air is sucked by the air introduction/suction unit 13 to bring the film 6 into tight fit with the cavity surface, and the process proceeds to the subsequent molding cycle.

In another method for the efficient mold release without using the ejector pin, the air feed means including the valve box and the valve element disposed therein so as to be movable up and down may be provided in the bottom surface of the lower mold portion. Upon the mold release after opening the mold, air is fed to the air feed means to cause the valve element to protrude into the cavity such that the molded product is extruded outside the lower mold portion.

FIGS. 7a and 7b are sectional views each representing the aforementioned method and the mold used therein. FIGS. 8a and 8b are sectional views each representing the air feed means.

The mold 20 is formed of an upper mold portion 21 and a lower mold portion 22.

The lower mold portion 22 includes a cavity 24, and air feed means 23 is disposed in the bottom surface of the lower mold portion 22. The air feed means 23 includes a valve box 25 attached to an opening of the bottom surface of the lower mold portion 22, a valve element 26 disposed within the valve box 25 so as to be movable up and down, and an air tube 25a having one end connected to the lower end of the valve box 25, and the other end connected to an oxygen tank. The valve element 26 is an inverted tapered mushroom valve having a flat top surface. A flange 26a is provided at the lower end of the valve element 26.

The valve box 25 as a cylindrical vessel has an open top surface and a closed bottom surface. Two upper and lower protrusions 27 and 28 are formed on the inner peripheral surface, which interpose the flange 26a.

Coil springs 30 each serving as an urging member are disposed between the upper protrusions 27 and the flange portion 26a in the urged state. The valve element 26 is urged downward by the coil springs 30. The valve element 26 is closed in the state where the flange portion 26a is pushed against the protrusions 28. At this time, the top surface of the valve element 26 is flush with the bottom surface of the lower mold portion 22. The upper end surface of the valve box 25 is also flush with the bottom surface of the lower mold portion 22. The air tube 25a is attached to the lower portion of the valve box 25.

The molding process to produce the molded product using the mold 20 will be described hereinafter.

In the state where the valve element 26 is closed as shown in FIG. 8a, a mold release agent is applied to the inner surface of the mold 20. Then the raw liquid, for example, urethane and the like is supplied into the lower mold portion 22, and the mold is clamped by moving the upper mold portion to produce the foam as shown in FIG. 7a. Upon completion of curing, the upper mold portion is separated to open the mold as shown in FIG. 7b to allow air to be fed into the valve box 25 such that a molded product 31 is pushed up by the air pressure to be released from the mold.

When air is fed into the valve box 25 through the air tube 25a, the valve element 26 is pushed up by the air pressure against the urging force of the coil springs 30 as shown in FIG. 8b. Air is fed into the space between the bottom surface of the lower mold portion 22 and the molded product 31 from the valve box 25 to push up the molded product 31 to be released from the lower mold portion 22.

When the air feed to the valve box 25 is stopped after the mold release, the valve element 26 is pushed down under the urging force of the coil springs 30 to return to the original state as shown in FIG. 8a. The molding process proceeds to the next cycle.

In the method for releasing the molded product from the cavity of the lower mold portion by the air pressure, if the molded product 31 has a large thickness as shown in FIGS. 7a and 7b, the molded product 31 is pushed up sufficiently by the air pressure. The resultant floating height L of the molded product floating from the upper surface of the lower mold portion 22 is sufficiently large. The operator is allowed to grip the portion of the molded product 31 floating from the lower mold portion 22 so as to easily take the molded product 31 from the lower mold portion 22.

Referring to FIGS. 9a and 9b, if the depth of the cavity 24A formed in the lower mold portion 22A of the mold 20A is substantially small, and accordingly, the molded product 31A has a small thickness, the air pressure is likely to leak from the lower side of the molded product 31A. Accordingly, the resultant floating height L of the molded product 31A is likely to become small. The operator has difficulty in gripping the floating portion of the molded product 31A to be released from the mold.

SUMMARY OF THE INVENTION

It is an object of the present invention to provide a foam molding method and a mold used therein, allowing efficient molding of a foam molded product with accurately finished outer surface and easy release of the molded product from the mold.

A mold for foam molding according to a first aspect of the present invention includes an upper mold portion and a lower mold portion, and gas feed means in a bottom surface of a cavity of the lower mold portion for pushing up a molded product within the cavity so as to be released from the mold. A recess portion connected to the cavity of the lower mold portion is formed on a mold joint surface of the lower mold portion, and a protruding portion which fits to the recess portion is formed on a mold joint surface of the upper mold portion.

In a foam molding method according to a second aspect of the present invention using a mold for foam molding according to the first aspect, a raw material is supplied into the lower mold portion, foam is produced after clamping the mold, and after separating the upper mold portion to open the mold, gas is fed to a space between a molded product and a bottom surface of the lower mold portion from the gas feed means to release the molded product from the mold.

With the mold and the molding method using the mold, a portion formed by extraction of the protruding portion will be exposed as the empty space when the upper mold portion is separated from the lower mold portion. In the case where the molded product is pushed up by applying the gas pressure to the lower side of the molded product, the tool or the finger of the operator is allowed to access the side surface of the molded product from the empty space for taking the molded product irrespective of the short floating height.

The recess portion is formed to have the same size as that of the protruding portion to prevent generation of burr caused by the molding material, for example, plastic which gets through the space between the recess portion and the protruding portion.

The protruding portion and the recess portion are graded for vent so as to allow easy separation of the upper mold portion from the lower mold portion and easy mold setting.

A plurality of the protruding portions and the recess portions are formed to allow easy release of the molded product.

In this case, the cavity is interposed between the protruding portion and the recess portion to allow easy release of the molded product while being held between those portions.

In the case where the protruding portion and the recess portion are formed on the two crossing sides of the cavity, the molded product may be easily released by contacting the tool or the finger with the molded product from two different directions.

Upon the mold release, air is used as the gas fed to the lower side of the molded product, resulting in the cost reduction.

The mold for foam molding and the foam molding method according to the present invention is applicable not only to the rigid urethane foam molding, but also various product molding.

BRIEF DESCRIPTION OF THE DRAWINGS

FIG. 1a is a perspective view of a mold for foam molding according to an embodiment. FIG. 1b is a perspective view of a molded product produced using the mold as shown in FIG. 1a.

FIG. 2 is a sectional view taken along line II-II shown in FIG. 1a.

FIG. 3a is a sectional view showing a foam molding method using the mold shown in FIG. 1a. FIG. 3b is a sectional view showing the foam molding method using the mold shown in FIG. 1a. FIG. 3c is a sectional view showing a foam molding method using the mold shown in FIG. 1a.

FIG. 4a is a sectional view showing the gas feed means. FIG. 4b is a sectional view showing the gas feed means.

FIG. 5 is a perspective view showing the mold for foam molding according to another embodiment.

FIG. 6a is an explanatory view showing the related art. FIG. 6b is an explanatory view showing the related art. FIG. 6c is an explanatory view showing the related art.

FIG. 7a is an explanatory view showing another related art. FIG. 7b is an explanatory view showing another related art.

FIG. 8a is a sectional view showing the gas feed means. FIG. 8b is a sectional view showing the gas feed means.

FIG. 9a is an explanatory view showing another related art. FIG. 9b is an explanatory view showing another related art.

BEST MODE FOR CARRYING OUT THE INVENTION

Figure 2:
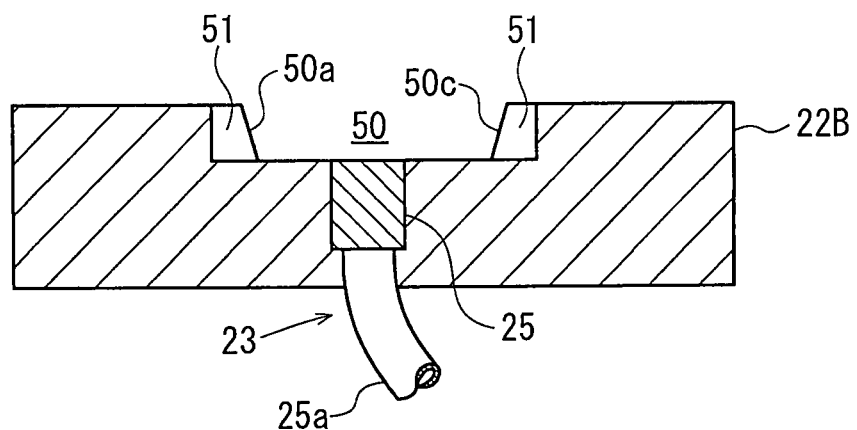

An embodiment will be described referring to the drawings. FIG. 1a is a perspective view of a mold for foam molding according to an embodiment. FIG. 1b is a perspective view of a molded product produced using the mold shown in FIG. 1a. FIG. 2 is a sectional view taken along line II-II shown in FIG. 1a. FIGS. 3a, 3b and 3c are sectional views each showing the foam molding method using the mold shown in FIG. 1a.

A mold 20B includes an upper mold portion 21B and a lower mold portion 22B.

Each of side surfaces 50a, 50b, 50c and 50d of a cavity 50 formed in the lower mold portion 22B is graded (tapered) for vent at an appropriate angle. A bottom surface of the lower mold portion 22B has gas feed means 23 formed therein. The gas feed means 23 which is the same as the one shown in FIG. 8 includes a valve box 25 attached to an opening of the bottom surface of the lower mold portion 22B and a valve element 26 disposed in the valve box 25 to be movable up and down.

Recess portions 51, 51 are formed in the mold joint surface (upper surface) 22f of the lower mold portion 22B so as to be connected with part of the opposite side surfaces 50a and 50c of the cavity 50. In the embodiment, each of the recess portions 51 has a depth which reaches the bottom surface of the cavity 50.

A pair of protruding portions 52, 52 are formed on the mold joint surface (lower surface) 21f of the upper mold portion 21B so as to be fit to the corresponding recess portions 51.

In the embodiment, the recess portion 51 has the same size as that of the protruding portion 52 such that they are tightly fit with no clearance left. The recess portion 51 and the protruding portion 52 are graded for vent. In the embodiment, the protruding portion 52 has a substantially square pillar shape, and each of four side surfaces are tapered such that the cross sectional shape of the pillar becomes smaller in the downward direction so as to form the vent gradient. Three side surfaces of the recess portion 51 are tapered conforming to the corresponding side surfaces of the protruding portion 52.

The molding process for producing the molded product using the mold 20B will be described.

The mold release agent is applied to the inner surface of the mold 20B. The raw liquid such as urethane is supplied into the lower mold portion 22B, and the upper mold 21B is moved to close the mold to produce the foam as shown in FIG. 3a. Upon completion of curing the foamed urethane, the upper mold is separated to open the mold as shown in FIG. 3b. Then air is fed into the valve box 25 to push up the molded product 31B by the air pressure so as to be released from the mold.

When air is fed into the valve box 25 through the air tube 25a, the molded product 31B is pushed up to allow the tool or the hand to grip the molded product 31B so as to be released from the lower mold portion 22B. Even if the floating height of the molded product 31B is insufficient, the recess portions 51 as empty spaces resulting from the extraction of the protruding portions 52 allow the tool or the finger to contact with both side surfaces of the molded product 31B. This makes it possible to easily release the molded product 31B from the cavity 50.

In the embodiment, the recess portions 51, 51 are formed partially in the side surfaces 50a, 50c of the cavity 50, respectively. The amount of air fed to the lower side of the molded product 31b, which leaks through the recess portions 51 is small. Accordingly, the molded product 31B is sufficiently pushed up by the air pressure. In the case where air cannot be fed into the cavity 50 from the valve box 25 because of the pump failure and the like, the tool or the finger is allowed to be inserted into the recess portions 51 to take the molded product 31B from the cavity 50.

In the embodiment, the valve element 26 has a flat top surface which is flush with the bottom surface of the lower mold portion therearound when the valve element 26 is closed. The molded product 31B has no mark of the valve element 26 formed thereon. As air pressure is only used to push up the molded product 31B, no mark resulting from the pushing operation is left on the molded product. The molded product 31B is produced in direct contact with the inner surface of the lower mold portion 22B without the film therebetween. Accordingly, the wrinkle of the film is never transferred onto the molded product 31B. The molded product 31B, thus, has accurately finished outer surface.

The process for producing the molded product 31B requires no step for bringing the film into contact with the lower mold portion 22B, thus reducing the molding cycle time. Additionally, the valve element 26 is automatically opened under the urging force of the coil springs 30, thus excellent molding performance.

In the embodiment, the valve element 26 is the mushroom valve as shown in FIGS. 8a and 8b. However, a flap type valve element 42 as shown in FIGS. 4a and 4b may be employed. Referring to FIGS. 4a and 4b, a valve box 41 which forms the air feed means 40 is attached to the opening of the lower mold portion 22B. The valve element 42 is provided rotatably to the valve box 41 via a hinge pin 43. The valve element 42 is urged toward the valve closing direction by a coil spring (not shown) wound around the hinge pin 43.

The outer periphery of the upper surface of the valve box 41 is flush with the bottom surface of the lower mold portion 22. The inner periphery of the upper surface of the valve box 41 has a stepped portion 41a which is engaged with the valve element 42. In the closed state as shown in FIG. 4a where the valve element 42 is engaged with the stepped portion 41a, the upper surface of the valve element 42 is flush with the bottom surface of the lower portion 22B therearound.

When air is fed into the valve box 41 through an air inlet 44 formed in the valve box 41, the valve element 42 is rotated upward under the air pressure such that air is fed to the space between the bottom surface of the lower mold portion 22B and the molded product as shown in FIG. 4b. When the air feed is stopped, the valve element 42 is stopped under the urging force of the coil spring.

The use of the gas feed means 40 makes it possible to efficiently produce the molded product with accurately finished outer surface.

Referring to FIGS. 1a to 3c, each of the recess portions 51 and the protruding portions 52 has a substantially square pillar shape. However, they may be formed into any other shapes. For example, they may be formed into the substantially dome-like shapes. In the embodiment shown in FIG. 5, the recess portion 51C has a depth smaller than that of the cavity 50. In this case, the molded product may be sufficiently released.

The aforementioned embodiments are examples of the present invention which may be modified into the form other than those shown in the drawings. For example, the recess portions and the protruding portions may be formed on two crossing sides of the cavity 50. Each number of the protruding portion 52 and the recess portion 51 to be provided may be 1, or 3 or more. Gas other than air may be fed by the gas feed means.

The present invention based on Japanese Patent Application No. 2004-25871, claiming the priority is incorporated herein by reference in its entirety.

The invention claimed is:

1. A foam molding method using a mold for foam molding including an upper mold portion having no recess formed on a lower surface of the upper mold portion, and a lower mold portion defining a cavity, wherein a portion of a vertical side wall of the cavity is recessed to form a recess portion formed on an upper surface of the lower mold portion, and a gas feeder in a bottom surface of the cavity of the lower mold portion, wherein a protruding portion which fits into the recess portion extends directly from the lower surface of the upper mold portion, the method comprising:
   supplying a raw material into the cavity of the lower mold portion;
   inserting the protruding portion into the recess portion after the raw material is supplied into the cavity;
   producing foam after clamping the upper mold portion of the mold to the lower mold portion of the mold;
   separating the upper mold portion from the lower mold portion to open the mold;

after separating the upper mold portion to open the mold, feeding gas to a space between a molded product and a bottom surface of the lower mold portion from the gas feeder to release the molded product from the lower mold portion,
wherein the separating the upper mold portion from the lower mold portion extracts the protruding portion from the recess portion thereby exposing an empty space; and
inserting a finger or a tool into the empty space to remove the molded product from the mold.

2. The foam molding method according to claim 1, wherein the molded product is formed of a rigid urethane foam.

3. The foam molding method according to claim 1, wherein the inserting the protruding portion into the recess portion comprises tightly fitting the protruding portion into the recess portion with no clearance therebetween.

4. The foam molding method according to claim 1, wherein the inserting the protruding portion into the recess portion displaces the raw material from the recess portion.

\* \* \* \* \*